United States Patent Office 3,283,772
Patented Nov. 8, 1966

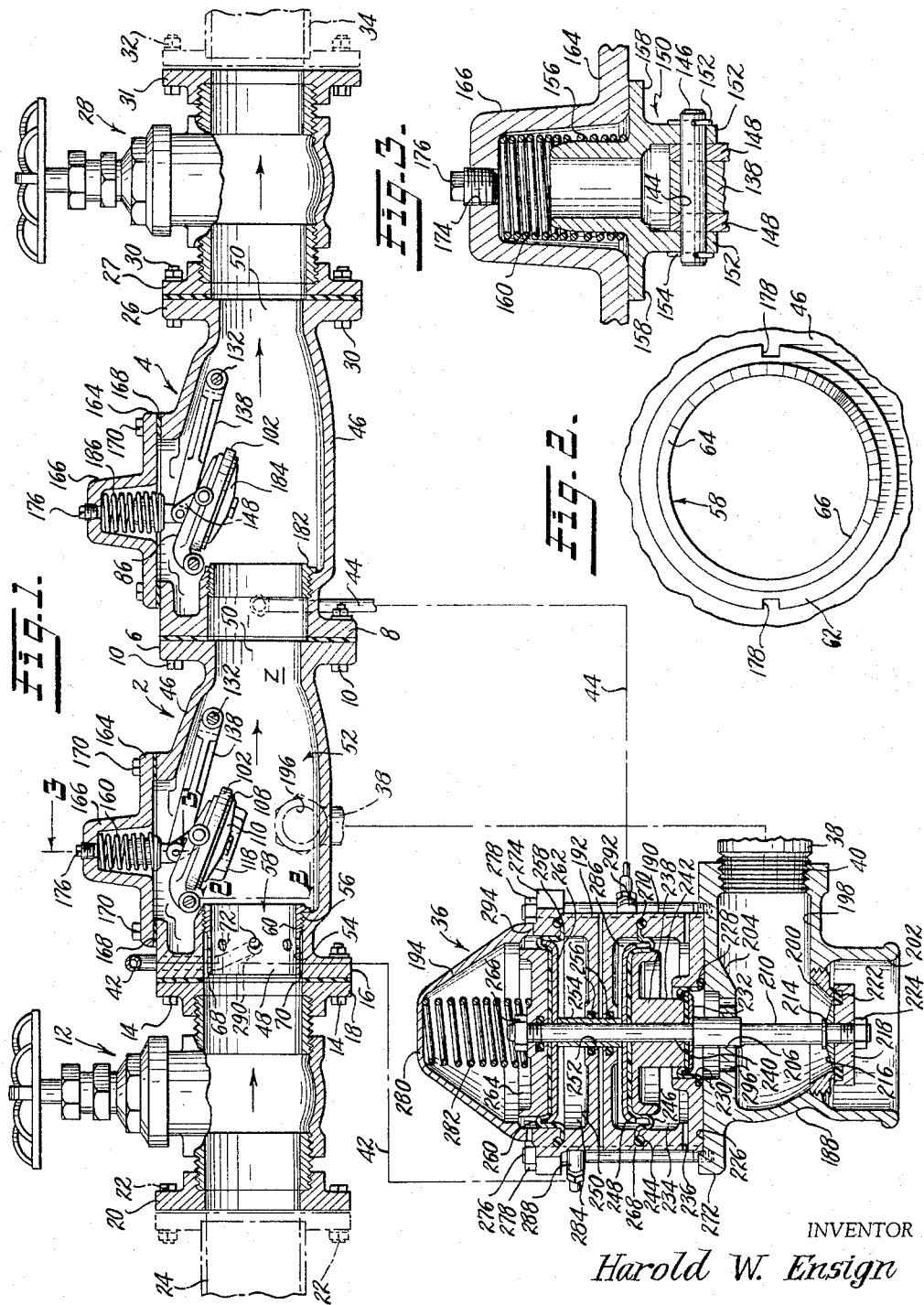

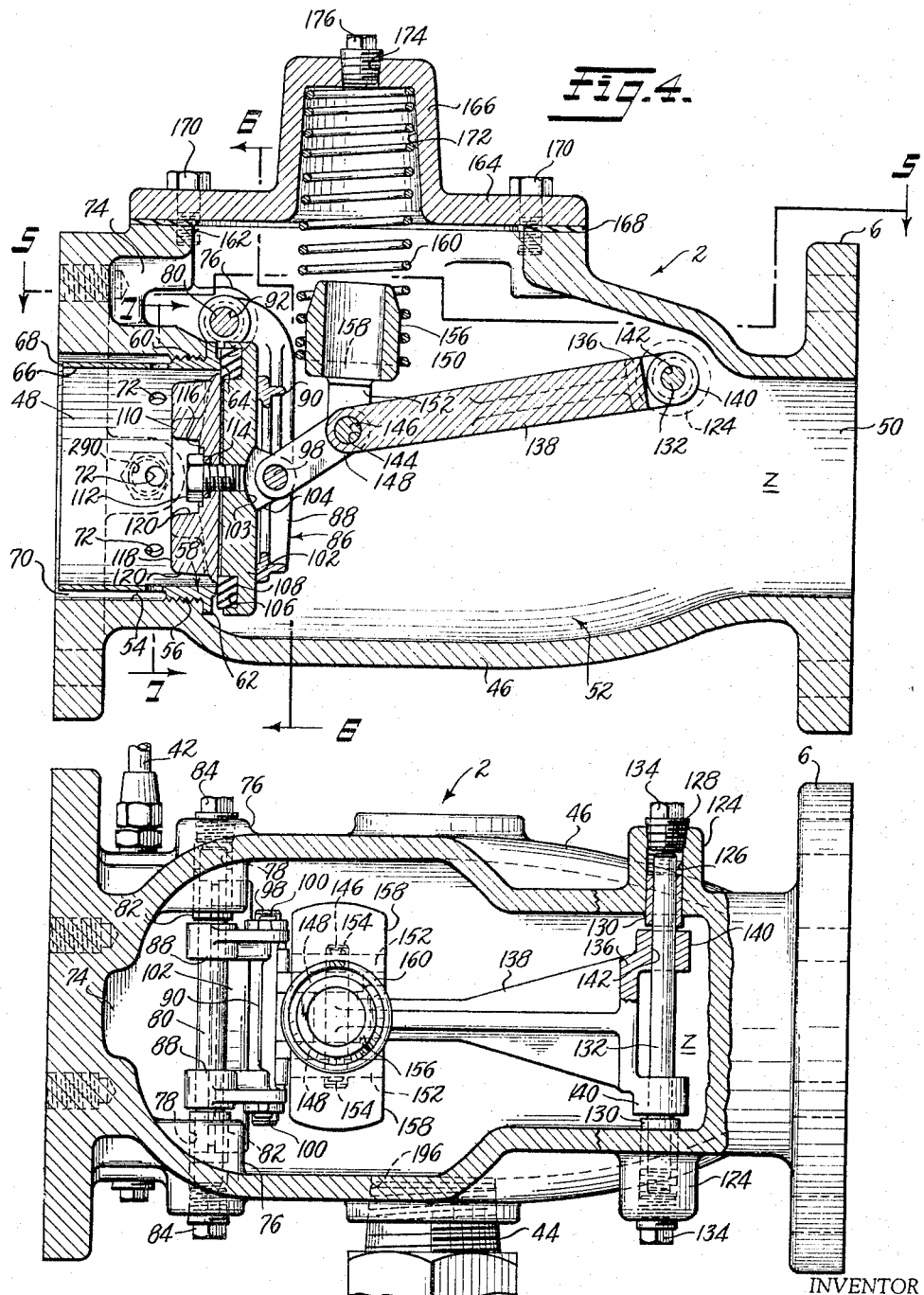

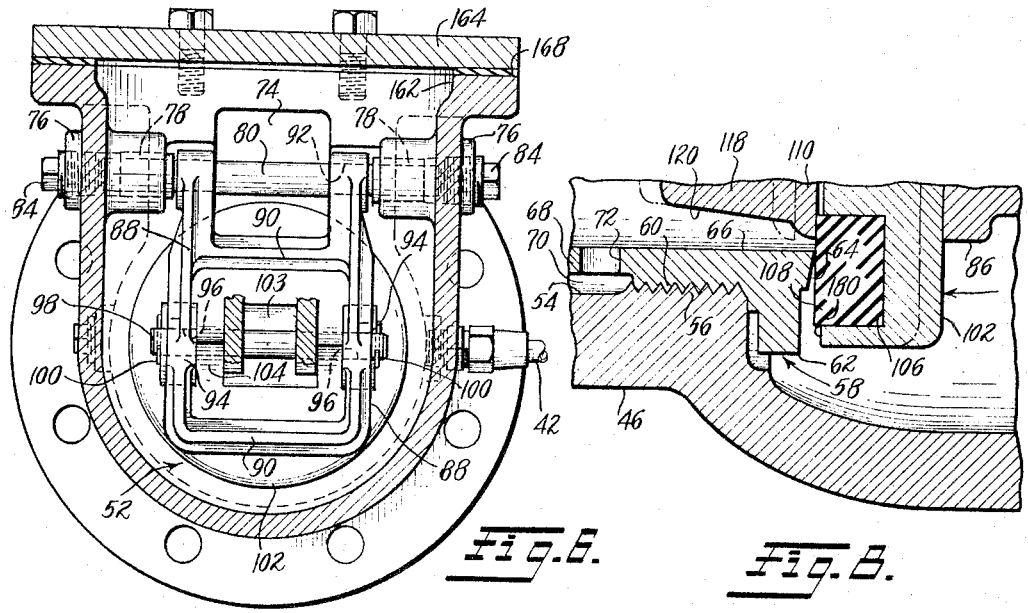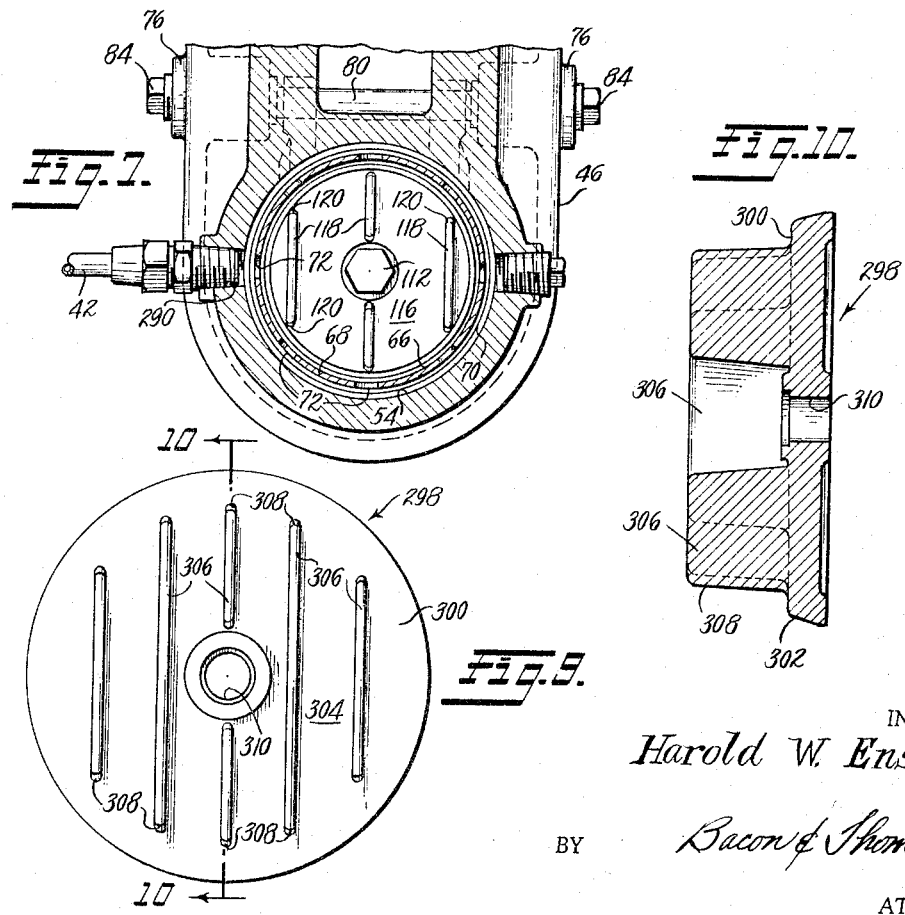

3,283,772
BACKFLOW PREVENTION DEVICE WITH IMPROVED PRESSURE SENSING MEANS
Harold W. Ensign, Fullerton, Calif., assignor to
Donald G. Griswold, Newport Beach, Calif.
Filed Feb. 4, 1964, Ser. No. 342,439
20 Claims. (Cl. 137—107)

The present invention relates generally to devices for preventing contamination of public water distribution systems supplying water to dwellings, hotels, institutions, factories, ships, and the like by preventing backflow or back-siphonage into the supply system. More particularly, the invention relates to an improved pressure sensing means for such devices which will facilitate the transmission inlet pressures accurately and quickly under conditions which might otherwise cause the device to malfunction.

More specifically, the invention relates to certain improvements in backflow prevention devices of the type (which are normally installed between two conventional gate valves) including a first check valve, a second check valve arranged in series with the first check valve, and a pressure differential operated relief, or bleeder, valve connected with a zone between the outlet of the first check valve and the inlet of the second check valve for draining said zone when a given pressure differential exists between the inlet pressure of the first check valve and the pressure in said zone. The relief valve is responsive to the differential of pressures across the first check valve derived from sensing points conveniently located at the inlet side of the first and second check valves and communicated to opposed pressure chambers in the relief valve. In a "reduced pressure principle" backflow prevention device, the relief valve is designed so that it will open when the pressure in the zone on the outlet side of the first check valve is reduced to within a certain amount of the pressure on the inlet side of said first check valve, as is well understood in the art. The accurate transmission of pressure from the sensing points is particularly important where as here, the relief valve is designed to operate on a low "reduced" pressure differential of about 2½ p.s.i.

In the normal operation of a backflow prevention unit, the gate valves at the opposite ends thereof are maintained in a wide open condition. However, if through inattention, or carelessness, the gate valve at the inlet end of the unit is "cracked," or only opened slightly, or is opened abnormally slowly, so that the pressure at the inlet of the first check valve is delayed in building up to true upstream pressure, the pressure differential operated bleeder valve will open. If the gate valve is left in the slightly opened condition, an abnormally low flow rate will result accompanied by jetting and/or turbulence which will prevent the pressure sensing port at the inlet of the first check valve from transmitting a pressure to the relief valve which accurately reflects the pressure condition on the inlet or upstream side of the backflow prevention device. The partial or very slow opening of the inlet gate valve is believed to create an erratic pattern flow that produces a nonuniform and low pressure area on the inner periphery of the throat of the first check valve, thereby interferring with the obtaining of an accurate pressure valve at the sensing point. In instances where this occurs, a low or false pressure will be transmitted to the pressure differential relief valve, with the result that the valve will open (if it was closed prior to opening of the inlet gate valve) and may remain open for a period long enough to cause excessive discharge or "splitting" through the relief valve. Of course, the pressure in the inlet opening of the first check valve will ultimately become great enough to effect closing of the relief valve, but the malfunction incident to the faulty condition of the inlet gate valve may result in pit flooding and needless waste of water.

The foregoing objectionable operation has been overcome by the present invention through the design and installation of means in the inlet throat of the first check valve, which will divert and entrap a portion of the incoming water and quickly communicate the pressure thereof to the inlet sensing port. Specifically, the above-mentioned problem has been overcome by providing a cylindrical extension or sleeve on the seat ring designed so that it will provide an annular cavity in the inlet throat in constant communication with the inlet sensing point. The cavity is open at its outer end to receive incoming water and is closed at its inner end. Improved sensing has been obtained by providing radial ports in the cylindrical sleeve adjacent the closed end of the annular cavity, and by designing the number and size of the ports so that their combined area is less than the radial cross-sectional area of the annular cavity. Still further improvement in sensing has been obtained by adding straightening vanes to the outer side of the valve closure or flow control element, which cooperates with the seat having the cylindrical sleeve associated therewith. The straightening vanes are particularly effective when the closure element is partially open, whereupon the vanes reduce turbulence and interrupt any swirling motion of the incoming water, and thus enable more accurate pressure sensing to be achieved by facilitating the rapid build-up of pressure in the annular cavity communicating with the pressure sensing point connected with one of the pressure chambers of the relief valve. The straightening vanes are preferably arranged parallel with the line of flow through the backflow prevention device. When the inlet gate valve is opened in a normal manner and opened sufficiently (usually wide open) to meet consumer demand, the sensing means in the inlet of the first check valve does not in any way interfere with the operation of the unit.

The principal object of the invention is to provide a backflow prevention device that will respond rapidly and with a high degree of sensitivity even under abnormally low flow rate conditions, resulting from abnormal adjustment of the inlet gate valve, to assure the maintenance of adequate pressure at the sensing point on the inlet side of the first check valve, to thereby prevent undesirable and needless opening of the relief valve.

Another object is to provide sensing means to be used in conjunction with a pressure responsive relief valve of a backflow prevention unit which will control said unit in a manner that is unaffected by the extent of opening of the inlet gate valve.

A further object is to provide an improved pressure sensing means for a backflow prevention device constructed to accurately sense pressure in the presence of erratic flow patterns of incoming water.

A still further object is to provide a pressure sensing means for the inlet of a fluid flow control valve constructed to accurately sense pressure within said inlet, even in the presence of erratic and unstable flow patterns.

Other objects and features of the invention will become apparent from the following detailed description, when considered in connection with the accompanying drawings, wherein:

FIG. 1 is a diagrammatic, longitudinal cross-sectional view through a backflow prevention unit incorporating therein the improved pressure-sensing means of the present invention;

FIG. 2 is a enlarged fragmentary, elevational view, particularly showing the wrench-engaging notches provided on the valve seat of the first check valve, as viewed on the line 2—2 of FIG. 1;

FIG. 3 is an enlarged, fragmentary, vertical cross-sectional view, taken along the line 3—3 of FIG. 1;

FIG. 4 is an enlarged cross-sectional view of the first check valve shown in FIG. 1;

FIG. 5 is a horizontal cross-sectional view taken along the line 5—5 of FIG. 4;

FIG. 6 is a vertical cross-sectional view taken along the line 6—6 of FIG. 4;

FIG. 7 is a fragmentary, vertical, cross-sectional view, taken along the line 7—7 of FIG. 4, particularly showing the ports in the sleeve and the straightening vanes on the retaining disc;

FIG. 8 is a further enlarged, fragmentary, cross-sectional view through the inner end of the seat and closure element of the check valve of FIG. 4;

FIG. 9 is an enlarged end elevational view of a modified retainer disc design particularly showing the arrangement of the flow-straightening vanes thereon; and FIG. 10 is a vertical, cross-sectional view through the retainer disc, taken along the line 10—10 of FIG. 9.

Referring now to FIG. 1, the present backflow prevention device or unit comprises a first check valve 2 and a second check valve 4, said check valves having flanged ends 6 and 8, respectively, connected by bolts 10. A first gate valve 12 is connected to the inlet side of the first check valve 2 by bolts 14, which pass through mating flanges 16 and 18 provided on the first check valve 2 and the gate valve 12, respectively. The inlet side of the first gate valve 12 is provided with a flange 20, and is connected by bolts 22 with a flanged supply pipe, or main, 24. The outlet side of the second check valve 4 is provided with a flange 26, and is connected with the flanged inlet 27 of a second gate valve 28 by bolts 30. The outlet end flange 31 of the gate valve 28 is connected by bolts 32 to a flanged service pipe 34, which leads to the consumer's premises. The gate valves 12 and 28 are similar and of conventional construction, and serve as shut-off valves for isolating the backflow unit from the supply main 24 and the service pipe 34 for purposes of replacement, inspection, repair, etc.

An automatic pressure differential responsive relief valve 36 is connected by piping 38 with the first check valve 2, so that its inlet 40 communicates with a zone Z, including the outlet of the first check valve 2 and the inlet of the second check valve 4. The relief valve 36 has pressure chambers (described later) that are connected by conduits, or tubes, 42 and 44, respectively, with pressure sensing points conviently located at the inlet end of the first and second check valves 2 and 4, respectively.

Referring to FIGS. 4 and 5, the first check valve 2 comprises a body 46, which is provided with the aforementioned flanges 6 and 16 at the opposite ends thereof. The body 46 is also provided with an inlet 48 and an outlet 50, separated by a chamber 52 with which the conduit 44 may be connected in lieu of the inlet of check valve 4. The inlet 48 includes an elongated cylindrical throat 54, which is larger in diameter than the outlet 50 and terminates at its inner end in a reduced-diameter threaded portion 56.

A tubular valve seat 58, FIGS. 4 and 8, has external threads 60 mounted in the threaded portion 56 of the inlet 48, and a radial flange 62 located at the inner end thereof. The flange 62 terminates in a beveled seat 64, which surrounds a cylindrical bore 66.

The threaded portion 60 of the seat 58 has an integral cylindrical sleeve 68 extending outwardly therefrom for almost the entire length of the cylindrical inlet throat 54, and cooperates therewith to define an annular cavity 70 surrounding said sleeve. The sleeve 68 is provided with a plurality of radially directed, circumferentially spaced ports 72 located near the inner threaded end thereof and lying on a common circumference or transverse plane. The radial cross-sectional area of the cavity 70 greatly exceeds the cumulative cross-sectional area of the ports 72, so that pressure build-up readily occurs in said cavity.

The valve body 46 has a recess 74 therein, positioned above the inlet 48, and a pair of transversely aligned bosses 76 is provided on the opposite side walls of said body above the seat 58, as is best shown in FIGS. 5 and 6. The bosses 76 have aligned bores 78 extending therethrough, which are threaded at their outer extremities. The opposite ends of a shaft 80 are received within the bores 78, bushings 82 being disposed between said shaft ends and the walls defining said bores. The shaft 80 is held in position by threaded plugs 84 mounted in the ends of the bores 78.

An integral hinge member 86 comprises a pair of spaced, vertically disposed, L-shaped arms 88 that are joined by a pair of transversely extending webs 90. The upper, forwardly projecting ends of the arms 88 have aligned bores 92 for pivotally mounting the same upon the shaft 80. A boss 94 is provided on each of the vertical portions of the L-shaped arms 88. These bosses have aligned bores 96 extending therethrough for the reception of the opposite ends of a pin 98, which is secured in position by cotter pins 100.

A closure element or flow control disc 102, FIGS. 4 and 6, is provided on the inner face thereof with a recess 103 and spaced ears 104 at the opposite ends of said recess, said ears having a cylindrical bore extending therethrough to receive the pin 98 to thus connect the disc 102 with the hinge member 86. The outer face of the element 102 is provided with an annular groove 106 positioned to confront the beveled seat 64. A resilient sealing ring 108, FIG. 4, is seated in groove 106 and is held in position by a retainer disc 110 secured to the element 102 by a centrally positioned cap screw 112, an O-ring seal 114, being provided to prevent fluid leakage between said cap screw and disc.

The outer face 116 of the retainer disc 110 has a generally convex shape, and is provided with transversely spaced, flow-straightening vanes 118. As is best shown in FIGS. 4 and 7, the vanes 118 extend parallel to each other and are disposed so that they will remain parallel to the axial direction of liquid flow through the sleeve 68 as the element 102 is pivoted counter-clockwise about the pin 80 to its open position. As is best shown in FIG. 4, the vanes 118 have inwardly diverging side edges 120, a diametrically positioned vane is interrupted centrally to provide space for the head of the cap screw 112.

The first check valve 2 is provided with toggle mechanism for operating the flow control element 102. Referring in particular to FIGS. 4 and 5, a pair of transversely opposed bosses 124 is provided near the outlet end of the body 46, and positioned in elevation about midway between the shaft 80 and the center of the inlet 48. The bosses 124 have aligned bores 126 which terminate at their outer ends in threaded portions 128. Bushings 130 are seated within the inner, unthreaded portions of the bores 126, and the opposite ends of a pin 132 are received in said bushings. The pin 132 is retained in position by threaded plugs 134.

Supported on the pin 132 is the bifurcated end 136 of a lever 138 having spaced ears 140 containing aligned bores 142 therethrough of a size to receive the pin 132. The other end of the lever 138 has a bore 144 through which passes a pin 146. A pair of links 148 having bores through the upper ends thereof is supported upon the pin 146 on opposite sides of the lever 138, and the lower end of said links is provided with a bore and pivotally supported on the pin 98 on the inner side of the ears 104. It should be noted that the links 148 and the lever 138 are proportioned in length, so that the axis of the pin 146 will remain above a line drawn between the axes of the pins 98 and 132 when the valve element 102 is engaged with the seat 58.

A yoke 150 is also mounted upon the pin 146, said yoke including a pair of downwardly projecting ears 152, FIG. 3, pivotally supported on the pin 146 outwardly of the links 148. The links 148, the lever 138, and the yoke 150 are secured in position on the pin 146 by cotter pins 154, which extend through transverse openings in the opposite ends of said pin. The yoke 150 includes an elongated, generally vertically disposed, cylindrical portion 156, which terminates at its lower end in a pair of diametrically disposed, transversely extending stops 158 (best seen in FIGS. 3 and 5). A compression spring 160 is telescopically received on the cylindrical portion 156 and its lower end is seated against the stops 158.

The valve body 46 is provided at the upper end thereof with a circular access opening 162, which is closed by a cover 164 having a hollow boss 166 located centrally thereof. A gasket 168 is disposed between the cover 164 and the body 46 and is secured in position by a plurality of cap screws 170. The boss 166 is positioned directly above the yoke 150, and has a frusto-conical recess 172 therein, within which is received the upper end of the compression spring 160. The upper end of the boss 166 is provided with a threaded opening 174, which is closed by a plug 176.

It will be understood that the proportions and arrangement of the lever 138, the links 148 and the pins 98, 132 and 146 are such that a toggle mechanism is formed wherein, when the valve element 102 is fully closed, the axis of the pin 146 lies above a horizontal line drawn through the axes of the pins 98 and 132. It will also be understood that the compression spring 160 acts on the toggle linkage through the yoke 150, tending at all times to urge the valve element 102 into valve closing engagement with the seat 58. It is also apparent that if the compression spring 160 should fail for any reason, the weight of the lever 138, the links 148, and yoke 150 will act through gravity to automatically tend to cause closing movement of said disc 102.

It will be further observed that valve body 46 is devoid of any interior obstructions betwen the valve seat 58 and the outlet opening 50, whereby fluid can flow through the valve 2 with a minimum of pressure loss. It will be still further understood that when the valve element 2 is in its wide open position, as shown in FIG. 1, the stops 158 on the yoke 150 engage the lower surface of the cover 164 around the entrance to the recess 172, and thus positively limit the extent of opening of said valve element and also the extent of compression of the spring 160.

The valve seat 58, which has the sleeve 68 formed integrally therewith, can be installed by first inserting it though the opening 162 in the body 46, and then manipulating it into the cylindrical throat 54, with the threaded portion 60 thereof engaging the threaded portion 56 of said cylindrical throat. The seat 58 is then threaded home, a pair of diametrically opposed notches 178 (FIG. 2) being provided in the periphery of the flange 62 for engagement by a suitable wrench to facilitate tightening of said seat.

The toggle mechanism is operable in the manner described to force the element 102 against the valve seat 58 for closing the valve 2 during a no demand period. The valve 2 is designed to prevent over-compression of the resilient ring 108 during closed periods, this feature being best shown in FIG. 8. As is shown in FIG. 8, the element 102 is movable from the position shown in full lines, to that indicated in phantom lines, under the effect of forces applied by the toggle mechanism, and/or by the pressure of fluid contained within the chamber 52. The flange 62 is arranged to confront the end edge 180 of the element 102, and is normally spaced therefrom by engagement of the projecting portion of resilient ring 108 with seat 64. Should the resilient ring 108 be abnormally compressed, the edge 180 will move into engagement with flange 62, thereby positively limiting the degree to which said resilient ring can be compressed.

The second check valve 4 is similar to the check valve 2, and identical elements of the check valves 2 and 4 are identified in the drawings by identical reference numerals. The check valve 4, however, is provided with a valve seat 182 that differs from the valve seat 58, in that it does not have a sleeve corresponding to the sleeve 68. Further, the retainer disc 184 of the valve 4 normally is not provided with straightening vanes. In addition, the compression spring 186 of the second check valve is weaker than the spring 160, so that the pressure differential required to unseat the element 102 of the check valve 4 is less.

Referring now to the relief valve 36, FIG. 1, the same comprises a body made of four sections 188, 190, 192 and 194. The lowermost section 188 has a threaded inlet opening 40 for receiving one end of the conduit 38, the other end of which is connected with a drain opening 196 provided in a side wall of the body 46 of the check valve 2. The section 188 also has a partition 198 with a threaded opening therein, in which a seat 200 is mounted. A discharge opening 202 communicates with the atmosphere and is disposed below the seat 200, the upper portion of said opening 202 being somewhat dome-shaped in order to provide minimum resistance to the discharge of water through the seat 200.

The lower body section 188 further includes an upper wall 204 having an opening 206, which slidably receives an enlarged portion 208 of a valve stem 210. The lower end 212 of the valve stem 210 is reduced and threaded, and extends from a shoulder 214 that forms an abutment for a clamping disc 216. A valve disc 218 carries an annular resilient ring 222 in an annular groove in the upper surface thereof. The disc 218 is mounted on the lower stem portion 212 and is held in place by a nut 224. The resilient ring 222 carried by the disc 218 cooperates with the seat 200 for controlling flow through the relief valve 36.

The upper wall 204 of the lower body section 188 is recessed, as indicated at 226, for the reception of the lower surface of the body section 190. The body section 190 has a groove 228, which receives the outer thickened edge of a rolling diaphragm 230. A clamping disc 232 is mounted upon the valve stem 210 and engages the upper face of the stem enlargement 208, to form a support for the lower side of the diaphragm 230. The body section 190 also contains a chamber 234 that continuously communicates with the atmosphere through vent openings 236 at the lower part of said chamber.

A piston 238 is mounted upon a reduced upper portion 240 of the valve stem 210, and includes a cylindrical portion 242. The upper edge of section 190 has an annular groove 244 therein for receiving the outer thickened edge of a diaphragm 246, which is larger than the diaphragm 230. The diaphragm 246 is secured in position by body section 192, and a clamping disc 248 is in engagement with the upper side of diaphragm 246.

The body section 192 has an intermediate transverse wall 250 provided with a central opening 252, which slidably receives a spacer sleeve 254, the lower end of which is engaged with the clamping disc 248. O-ring seals 256 are provided in the cylindrical wall of the opening 252 for preventing the leakage of fluid past the spacer sleeve 254.

The body section 194 serves as a cover and has a groove 258 at its lower edge, which receives the thickened margin of a rolling diaphragm 260 that is identical to the diaphragm 246. A clamping washer 262 is engaged with the upper end of the spacer 254, and forms a support for the lower side of the diaphragm 260. A piston 264 is mounted upon the stem portion 240, and engages the upper side of the diaphragm 260. The upper extremity of the stem 210 is threaded, and a nut 266 mounted thereon secures the clamping disc 232, diaphragm 230, piston 238, diaphragm 246, clamping disc 248, spacer sleeve 254, clamping disc 262, diaphragm 260 and piston 264 in assembled relation with the stem 210. It will be noted that the clamping discs 232, 248 and 262 all have margins that are cupped to provide good support for the rolling diaphragms 230, 246 and 260, respectively, associated therewith.

The body sections 190 and 192 are maintained in proper registration by a marginal ridge 268 on the section 190, and a complementary marginal recess 270 formed on the section 192. The section 192 and the cover 194 are maintained in registration by a similar ridge and recess arrangement.

The body section 188 has a generally square flange 272 at its upper end, and the cover section 194 has a similar flange 274 formed at its lower end. A stud 276 is mounted at each corner of the flange 272, and the upper end thereof projects upwardly through confronting bores in the flange 274. A nut 278 is threaded onto the upper end of each stud 276 for securely clamping the body sections 188, 190, 192 and 194 together. The cover section 194 is hollow, and has a wall 280 engaged by the upper end of a calibrated compression spring 282, the lower end of which is engaged with the piston 264.

The intermediate wall 250 in the body section 192 cooperates with the diaphragms 260 and 246 to provide an upper pressure chamber 284 and a lower pressure chamber 286, respectively. A threaded opening communicates with the chamber 284, and has a special fitting 288 mounted therein, which is connected to one end of the tube 42 leading from a sensing port 290 provided in the body 46 and communicating with the inlet chamber of the first check valve 2. The sensing port 290, as is best shown in FIG. 4, is positioned near the inner end of the annular cavity 70, and is thus arranged to sense pressure within said cavity. A similar threaded opening communicates with the lower pressure chamber 286 and has a special fitting 292 mounted therein, which is connected to one end of the tube 44 leading from the inlet of the check valve 4. Pressure fluid communicated to the upper pressure chamber 284 through the tubing 42 will act upon the valve stem 210 through the diaphragm 260, in opposition to the force of the spring 282, and tend to move the valve stem 210 quickly in a direction to rapidly close the relief valve 36, or to maintain it closed.

On the other hand, pressure fluid to the lower chamber 286 through the tube 44 will act on the valve stem 210 through the diaphragm 246 and tend to move said valve stem in a direction to slowly open the relief valve 36. The pressure in the chamber 286 is supplemented by the force of the spring 282 tending to open the relief valve 36.

The force exerted by the spring 282 is preferably such that a "reduced" pressure differential of only about 2½ p.s.i., or less, in the chambers 284 and 286 will cause the relief valve 36 to open, and thereby effect drainage of liquid from the zone Z. In this connection, the cover section 194 is vented to the atmosphere through openings 294, so that atmospheric pressure acts upon the upper side of the piston 264 and on the diaphragm 260, against hydraulic pressure in the chamber 284. Similarly, atmospheric pressure acts upon the lower surface of the piston 238 and diaphragm 246 through the vent openings 236, against the hydraulic pressure in the chamber 286. The wall 204 of the body section 188 has ports 296 therein, which communicate the inlet pressure of the relief valve 36 to the lower side of both the clamping disc 232 and the diaphragm 230. Atmospheric pressure is effective upon the upper side of the diaphragm 230 through the vent openings 236.

The design of the relief valve 36 is such that when operating as a component of a backflow unit, it will normally remain in closed position so long as the difference in the pressure at the inlet of the check valve 2 and in the zone Z between the two check valves 2 and 4 exceeds about 2 p.s.i. If the pressure differential drops to about 2 p.s.i., the relief valve 36 will open and continue to open wider, should the pressure in the zone Z decrease relative to the pressure at the inlet side of the first check valve 2.

In the normal operation of the present backflow unit, the gate valves 12 and 28 will be fully opened, the check valves 2 and 4 will be open, and relief valve 36 will be closed, as shown in FIG. 1. The first check valve 2 by itself would reduce the supply pressure by a predetermined amount. The second check valve 4 also reduces the pressure, but in a lesser amount. During normal flow, and at the cessation of flow, the pressure in the zone Z between the check valves 2 and 4 will be less than the pressure in the supply main 24, but the differential will be more than adequate to maintain the relief valve 36 closed.

It will be seen from the foregoing that proper operation of the relief valve 36 is dependent upon the pressure within the inlet 48 being communicated to the upper pressure chamber 284. If the pressure within the chamber 284 does not accurately reflect the pressure condition within the inlet 48, then improper operation of the relief valve 36 will result. More particularly, if upon inflow into the first check valve 2 from the main 24, the pressure within the pressure chamber 284 is lower than the actual pressure within the inlet 48, then the relief valve 36 may open and remain open for an indefinite period; this will result in an unnecessary and undesirable discharge of water from the zone Z through conduit 38 and the relief valve 36. As has been described hereinabove, abnormally low flow rate conditions may result in faulty transmission of pressure from the inlet 48 to chamber 284 of the relief valve 36, unless means is provided to insure accurate sensing at the port 290.

According to the present invention, the annular cavity 70, defined between the inlet throat 54 and the sleeve 68 of the inlet check valve 2, functions to divert and entrap incoming water and to cause the pressure thereof to be quickly communicated to the conduit 42 connected with the sensing port 290, so that an accurate pressure value is obtained, even in the presence of erratic flow patterns. While the cavity 70 offers some improvement in relief valve response, even without the ports 72 in the sleeve 68, it has been found that the use of a plurality of such circumferentially spaced ports results in substantially improved pressure sensing at the inlet 48 of the check valve 2, due to the rapid build-up of pressure in the cavity 70 equal to that of the incoming water.

The straightening vanes 118 have been provided on the retainer disc 116 to break up swirling flow through the inlet 48, and they thus contribute significantly to the accuracy of pressure values sensed through the port 290. The vanes 118 function, particularly during the initial opening of the valve element 102, to substantially eliminate all turbulence. The number and dimensions of such vanes can be varied, depending upon the inlet pressure, flow rate, the size of the first check valve, etc.

Referring to FIGS. 9 and 10, a retainer disc 298 is illustrated for use with a check valve considerably larger in size than the check valve 2. The retainer disc 298 is similar in construction to the disc 116, and includes a circular base 300 having a generally frusto-conical marginal periphery 302. The front face of the base 300 is provided with five vanes 306, the ends 308 of each of said vanes being tapered slightly to diverge inwardly. The center vane has a break therein to provide space for a counterbored opening 310 and space to receive the head of a cap screw (not shown) for securing the retainer to a valve element.

The check valves 2 and 4, illustrated in FIG. 1, are 4 inch valves. The inlet 48 of the check valve 2 is greater than 4 inches in diameter so that it can receive the sleeve 68, which has a 4 inch bore. The outlet 50 has a diameter of about 4 inches. For such size valve, the vanes 118 on the retainer disc 110 are preferably three in number, as shown in FIG. 7, and are spaced about 1¼ inches apart on center. The vanes 118 have a thickness of about 0.13 inch, and a maximum axial height of about ¾ of an inch. For the retainer disc 298, which typically can be for an 8 inch check valve, five vanes 306 are provided, which are also 1¼ inches apart on center. The vanes 306 preferably project about 2 inches, and are about 0.19 inch in thickness. The outer ends of the vanes 118 and the vanes 306 preferably taper inwardly on an angle of about 3 degrees relative to the axis of the retainer discs 116 and 304, respectively.

The dimensions of the sleeve 68 and the ports 72, as well as the annular cavity, will vary, depending upon the size of the valve. As one operative example, for a 4 inch valve, the throat may have a diameter of about 4.63 inches. The sleeve 68 will have an inner diameter of about 4 inches and a radial thickness of about 0.12 inch. The radial width of the cavity 70 therefor, will be about .195 inch. The length of the cavity 70 will be about 2.08 inches. The ports 72 will be eight in number, equally spaced, and about 0.250 inch in diameter. The centers of the ports 72 will be spaced about 0.406 inch from the inner closed end of the cavity 70. With the dimension given above, the cross-sectional area of the cavity 70 would be 2.716 square inches and the combined sum of the cross-sectional areas of the ports 72 would be 0.392 square inch. From these values, it will be apparent that the cross-sectional area of the cavity 70 is 6.93 times greater than the total area of the ports 72. The dimensions noted above are subject, of course, to conventional machining tolerances. In all instances the transverse cross-sectional area of the cavity 70 will substantially exceed the combined areas of the ports 72 so that water can enter the cavity much faster than it can escape through the ports 72, whereby a restriction to flow from the cavity is effected to assure quick build-up of sensing pressure under adverse operating conditions.

It is to be understood that, while the pressure-sensing arrangement of the present invention has been described and illustrated with reference to a check valve, and to the contribution it makes to the improved operation of a backflow prevention unit, it is not limited to such use. Indeed, the pressure-sensing arrangement, comprising the annular cavity defined by the sleeve 68, and/or the ports 72, and/or the flow straightening vanes, can be used in other flow devices for furnishing accurate sensing pressure under turbulent flow conditions.

It is obvious that many modifications and variations of the present invention are possible in the light of the above teachings. It is, therefore, to be understood that within the scope of the appended claims, the invention may be practiced otherwise than as specifically described.

I claim:

1. A backflow prevention unit adapted to be connected between a water supply main and a service pipe, comprising: a first check valve and a second check valve, said check valves being arranged in series, said first check valve having an inlet to be subjected to the pressure in said supply main and also having a sensing port in communication with said inlet, and said second check valve having an outlet to be subjected to the pressure in said service pipe; a flow control element in said first check valve arranged to prevent reverse flow through the inlet of said first check valve; a relief valve having pressure differential responsive means controlling flow therethrough, said relief valve having an inlet communicating with a zone between the outlet of the first check valve and the inlet of the second check valve for effecting draining of said zone when a predetermined pressure differential is effective upon said pressure responsive means of said relief valve; means connecting said pressure responsive means of said relief valve with said sensing port and with said zone, respectively, for applying the pressure at said sensing port and said zone to said means; and means in the inlet of said first check valve for diverting and entrapping a portion of the incoming water to assure rapid transmission of the pressure of said incoming water to said pressure responsive means.

2. A backflow prevention unit as recited in claim 1, wherein the last-mentioned means provides an annular cavity in the inlet of said first check valve, said cavity opening outwardly to confront the direction of flow from said supply main, and said sensing port being in direct communication with said annular cavity.

3. A backflow prevention unit as recited in claim 2, wherein the inner periphery of said annular cavity is formed by a cylindrical element supported within said inlet of said first check valve.

4. A backflow prevention unit as recited in claim 3, wherein the cylindrical element has a plurality of circumferentially spaced, radially directed ports extending therethrough.

5. A backflow prevention unit as recited in claim 2, wherein the flow control element has a plurality of vanes thereon in the path of fluid flow through the inlet of the first check valve, and wherein said vanes are arranged to reduce turbulence in said inlet and to straighten flow axially through said inlet.

6. A backflow prevention unit adapted to be connected between a water supply main and a service pipe, comprising: a first check valve and a second check valve, said check valves being arranged in series, said second check valve having an outlet to subjected to the pressure in said service pipe, and said first check valve including: an inlet to be subjected to the pressure in said supply main, and to receive flow therefrom, means within said inlet defining an annular cavity, said cavity being open at its outer end, to receive a portion of the flow from said supply main, and being closed at its inner end; said first check valve having a sensing port in communication with said annular cavity; a relief valve having an inlet, an outlet, and pressure differential responsive means controlling flow therebetween, said inlet communicating with a zone between the outlet of said first check valve and the inlet of the second check valve for effecting draining of said zone; and means connecting said pressure responsive means with said sensing port and with said zone for applying differential pressure thereto.

7. A backflow prevention unit as recited in claim 6, wherein said first check valve includes a body, and wherein the inlet is defined by an elongated cylindrical throat at one end of said body, and wherein said means defining said annular cavity comprises a cylindrical sleeve supported concentrically within said cylindrical throat.

8. A backflow prevention unit as recited in claim 7, wherein the cylindrical sleeve extends nearly the entire length of said cylindrical throat.

9. A backflow prevention unit as recited in claim 7, wherein the cylindrical sleeve has a plurality of circumferentially spaced ports therethrough.

10. A backflow prevention unit as recited in claim 6, wherein the first check valve includes a seat disposed at the inner end of said inlet; and wherein a flow control element is pivotally supported within said first check valve and is engageable with said seat, and wherein said element has a plurality of flow-straightening vanes on the face thereof facing said inlet and extending parallel with the direction of flow through said first check valve.

11. A backflow prevention unit adapted to be connected between a water supply main and a service pipe, comprising: a first check valve and a second check valve, said check valves being arranged in series, said second check valve having an outlet to be subjected to the pressure in said service pipe, and said first check valve including: a body having an inlet to be subjected to the pressure in said supply main and to receive flow therefrom, said inlet comprising an elongated cylindrical throat in one end of said body, a seat within said body surrounding the inner end of said throat, a flow control element pivotally supported within said body and engageable with said seat to prevent reverse flow through said inlet, said flow control element having a plurality of vanes on the side thereof facing said inlet for reducing turbulence in said inlet and straightening flow therethrough as said flow control element moves in a valve opening direction; and a cylindrical sleeve supported concentrically within said throat and having a portion cooperating with said throat to form an annular cavity open at its outer end to receive flow from said supply main, said cavity being closed at its inner end, said sleeve extending for nearly the full length of said throat and having a plurality of circumferentially spaced radial ports extending therethrough near the inner end of said sleeve, the radial cross-sectional area of said cavity being greater than the combined areas of said radial ports, said body being provided with a sensing port in communication with said cavity at a point near the closed inner end of said cavity; a differential pressure responsive relief valve communicating with said check valves at a zone between the outlet of the first check valve and the inlet of the second check valve for effecting draining of said zone; and means connecting said relief valve with said sensing port and with said zone for applying differential pressure thereto to control the opening and closing of said relief valve.

12. A valve, comprising: a body having an inlet and an outlet, said inlet being connectible to a supply of fluid under pressure and including an elongated cylindrical throat at one end of said body, said body having a sensing port in communication with said cylindrical throat; a seat within said body surrounding the inner end of said throat; a closure element in said body engageable with said seat; and means in said inlet arranged to divert and entrap incoming fluid and cause the pressure thereof to be quickly and accurately communicated to said sensing port.

13. A valve as recited in claim 12, wherein the last-mentioned means includes a sleeve portion of smaller outside diameter than the inlet throat concentrically mounted in said throat and forming therewith an elongated annular cavity, said cavity being open at its outer end to receive a portion of the incoming fluid, and being closed at its inner end, and wherein the sensing port is in communication with said cavity at said inner end.

14. A valve as recited in claim 13, wherein the sleeve extends nearly the entire length of said throat, and is provided with a plurality of circumferentially spaced, radially directed ports therethrough, said ports lying on a common circumference and being disposed near the inner end of said sleeve, and wherein the cross-sectional area of said annular cavity is greater than the combined cross-sectional areas of said plurality of ports.

15. A valve as recited in claim 12 wherein the closure element has a plurality of flow-straightening vanes on the side thereof facing said inlet, and wherein said vanes are disposed substantially parallel to the direction of fluid flow through said inlet.

16. In a device to be connected in a pipeline, a body having: an inlet to be subjected to the upstream pressure in said pipeline, an outlet to be subjected to the downstream pressure in said pipeline, and a pressure sensing port in communication with said inlet; and means in said body operatively associated with said sensing port for communicating to said sensing port a pressure which accurately corresponds to the pressure supplied to said inlet from said pipeline, said means forming an annular cavity in said inlet, said cavity being open at its outer end to confront and receive flow from said pipeline and being closed at its inner end, said sensing port communicating with said cavity near said closed inner end.

17. A device as recited in claim 16, wherein the inlet comprises an elongated cylindrical throat in one end of the body, and wherein the means associated with the sensing port includes a cylindrical sleeve supported concentrically within said throat, and wherein the annular cavity is formed by said sleeve and the surrounding wall of said throat, and wherein said sleeve has a plurality of circumferentially spaced, radially extending ports therethrough, disposed on a common circumference near the inner end of said annular cavity.

18. A device as recited in claim 17, wherein said sleeve extends nearly the entire length of said throat, and wherein the cross-sectional area of said annular cavity exceeds the combined cross-sectional areas of said radially extending ports.

19. A device as recited in claim 17, including, additionally, means in said body for reducing fluid turbulence at the inner end of said sleeve.

20. A device as recited in claim 19, wherein the fluid turbulence-reducing means comprises a plurality of vanes supported on an element mounted within said body adjacent the inner end of said throat and wherein the vanes extend parallel to the direction of flow through said sleeve.

References Cited by the Examiner

UNITED STATES PATENTS

| | | | |
|---|---|---|---|
| 199,814 | 1/1878 | Fifield | 251—118 |
| 1,180,817 | 4/1916 | Ballard | 137—107 X |
| 2,046,030 | 6/1936 | Muend | 251—118 |
| 2,059,656 | 11/1936 | Ring. | |
| 2,503,424 | 4/1950 | Snyder | 137—116 |
| 2,789,785 | 4/1957 | Woods | 251—173 X |
| 2,893,414 | 7/1959 | Snyder | 137—116 |
| 2,978,222 | 4/1961 | Henrion | 251—173 |
| 3,173,439 | 3/1965 | Griswold | 137—107 |

WILLIAM F. O'DEA, *Primary Examiner.*

C. GORDON, *Examiner.*